United States Patent
Whiteford

[19]

[11] Patent Number: 6,065,742
[45] Date of Patent: May 23, 2000

[54] MULTI-DIRECTIONAL TUNED VIBRATION ABSORBER

[75] Inventor: Gerald P. Whiteford, Waterford, Pa.

[73] Assignee: Lord Corporation, Cary, N.C.

[21] Appl. No.: 08/713,384

[22] Filed: Sep. 13, 1996

[51] Int. Cl.[7] .................................................. F16M 1/00
[52] U.S. Cl. .................................. 267/140.5; 267/141.5; 188/378; 248/557
[58] Field of Search ................................. 188/378, 379, 188/380; 267/140.5, 141.3, 141.4, 141.5, 153, 292; 244/54; 248/557

[56] References Cited

U.S. PATENT DOCUMENTS

| | | | |
|---|---|---|---|
| 3,388,772 | 6/1968 | Marsh et al. ................................. | 188/1 |
| 3,419,111 | 12/1968 | Jones et al. ................................. | 188/1 |
| 3,430,902 | 3/1969 | Lohr .......................................... | 248/18 |
| 3,487,888 | 1/1970 | Adams et al. ............................... | 181/33 |
| 3,572,112 | 3/1971 | Igoe .......................................... | 188/380 |
| 3,668,939 | 6/1972 | Schrader ..................................... | 74/61 |
| 4,371,858 | 2/1983 | Kanoi et al. ............................... | 336/100 |
| 4,403,762 | 9/1983 | Cogswell et al. ......................... | 248/559 |
| 4,744,547 | 5/1988 | Hartel ....................................... | 267/141 |
| 4,805,851 | 2/1989 | Herbst ....................................... | 244/54 |
| 4,811,919 | 3/1989 | Jones ........................................ | 244/54 |
| 5,108,045 | 4/1992 | Law et al. ................................. | 241/54 |
| 5,127,607 | 7/1992 | McGuire ................................... | 244/54 |
| 5,174,552 | 12/1992 | Hodgson et al. ......................... | 267/140.11 |
| 5,176,339 | 1/1993 | Schmidt .................................... | 244/54 |
| 5,197,692 | 3/1993 | Jones et al. ............................... | 244/54 |
| 5,291,975 | 3/1994 | Johnson et al. .......................... | 188/378 |
| 5,310,137 | 5/1994 | Yoerkie, Jr. et al. ................. | 244/17.27 |
| 5,333,819 | 8/1994 | Stetson, Jr. ................................ | 244/164 |
| 5,351,930 | 10/1994 | Gwinn et al. ............................. | 248/557 |
| 5,374,039 | 12/1994 | Schmidt et al. ......................... | 267/140.13 |
| 5,413,320 | 5/1995 | Herbst ...................................... | 267/140.13 |
| 5,435,531 | 7/1995 | Smith et al. .............................. | 267/140.11 |
| 5,487,305 | 1/1996 | Ristic et al. .............................. | 73/514.32 |
| 5,687,948 | 11/1997 | Whiteford et al. ...................... | 248/635 |

FOREIGN PATENT DOCUMENTS

| | | |
|---|---|---|
| 0 204 330 | 12/1986 | European Pat. Off. . |
| 0 552 695 A1 | 7/1993 | European Pat. Off. . |
| 937 068 | 4/1948 | France . |
| 42 09 610 C1 | 3/1993 | Germany . |
| 92 09 913 | 9/1993 | Germany . |
| 53-060462 | 5/1978 | Japan . |
| 2179421 | 3/1987 | United Kingdom . |
| 2 218 776 | 11/1989 | United Kingdom . |
| WO 97/12160 | 4/1997 | WIPO . |

OTHER PUBLICATIONS

IR–2295 (MF), Patent Application entitled: "Vibration Isolation System Including A Passive Tuned Vibration Absorber".

IR–1761 (ES), Patent Application entitled: "Active Tuned Vibration Absorber", Oct. 12, 1994.

*Primary Examiner*—Robert J. Oberleitner
*Assistant Examiner*—Pamela J. Lipka
*Attorney, Agent, or Firm*—Randall S. Wayland

[57] ABSTRACT

A Multi-Directional Tuned Vibration Absorber (MDTVA) (23) including a first tuning mass (32) vibrating at a first resonant frequency fn1 along a first axis, a second tuning mass (34) vibrating at the first resonant frequency along said first axis and also at a second resonant frequency fn2 along a second axis, a base member (21), a first spring (35) flexibly interconnected between the base member (21) and the first tuning mass (32), the first spring (35) substantially restricting motion of the first tuning mass (32) to motion along a first axis only, and a second spring (36) flexibly interconnected between the first tuning mass (32) and the second tuning mass (34), the second spring (36) substantially restricting relative motion between the first tuning mass (32) and second tuning mass (34), such that the relative motion of said second tuning mass (34) at said second frequency fn2 is along the second axis which is substantially perpendicular to the first axis. In another aspect, the first and second resonant frequencies fn1 and fn2 may be tuned independently by addition of wafer-like masses and/or adjustment of the position of the second tuning mass (34) and the MDTVA (23) can be used in a vehicle's isolation system.

25 Claims, 3 Drawing Sheets

MULTI-DIRECTIONAL TUNED VIBRATION ABSORBER

BACKGROUND OF THE INVENTION

The present invention relates to Tuned Vibration Absorbers (TVAs) for reducing/absorbing vibration of a member.

BACKGROUND OF THE INVENTION

Elastomeric engine mounts are known for attaching an engine to structure. Commonly assigned Lord® U.S. Pat. No. 4,805,851 to Herbst entitled "Turbine Engine Mounting Bracket Assembly", U.S. Pat. No. 5,108,045 to Law et al. entitled "Engine Mounting Assembly", U.S. Pat. No. 5,176,339 to Schmidt entitled "Resilient Pivot Type Aircraft Mounting", and U.S. Pat. No. 5,351,930 to Gwinn entitled "Mountings for Engines and the Like" all describe engine mounting systems for attaching a vibrating engine, or the like, to a structure.

To operate most effectively, a mount, otherwise referred to as an isolator, must have a very rigid structure to act against. When considering very soft structures, there is very little resistance for the mount to act against. Therefore, because the structure is always arranged in a series-spring relationship to the isolator/mount, as the vibrating member acts against the isolator, some of the vibration will necessarily be transmitted to the structure. This dilemma could be solved by making the isolator very soft in comparison to the structure. However, this generally results in unacceptably high static motions across the isolator, which may exceed sway-space requirements. Therefore, there is a need for a device which can increase the apparent stiffness of a structure in multiple directions such that an isolation system can provide excellent multi-directional vibration isolation even when attached to a soft structure.

Fluid mounts which utilize fluid inertia to create amplified fluid inertia forces are also known for attaching a vibrating member to a structure. Commonly assigned Lord® U.S. Pat. No. 4,811,919 to Jones entitled "Volume Compensated Fluid Mount", U.S. Pat. No. 5,127,607 to McGuire entitled "Fluid Torque Restraint System with Optimized Fluid Expansion", U.S. Pat. No. 5,197,692 to Jones et al. entitled "Adaptive Fluid Mount", U.S. Pat. No. 5,374,039 to Schmidt et al. entitled "Fluid-And-Elastomer Device", and U.S. Pat. No. 5,413,320 to Herbst entitled "Fluid Mount for Devices such as Engines" describe various fluid mountings which may provide amplified fluid inertia effects or damping effects to further counteract vibration. Notably, these devices when attached to a soft structure are also somewhat ineffective, as they, too, generally require a relatively stiff structure to push against. Further, they are generally uni-directional.

U.S. Pat. No. 5,174,552 to Hodgson et al. entitled "Fluid Mount with Active Vibration Control" teaches an actively-controlled fluid mounting for controlling vibration. Although, actively-controlled fluid mounts can attach to a soft structure and be very effective, they may be too complex and expensive for some cost-driven applications. Co-pending LORD® application Ser. No. 08/322,123 entitled "Active Tuned Vibration Absorber" describes one Active Vibration Absorber (AVA) which may attach to an inner member of an elastomer mounting, or the like, and allows isolation over a wide frequency range.

U.S. Pat. No. 3,487,888 to Adams et al. entitled "Cabin Engine Sound Suppresser" teaches the use of multiple metal spring-beam type tuned vibration absorbers attached to an aircraft yolk, such as in a commercial aircraft. Notably, this suppresser system is effective at reducing vibration in only two directions, i.e., radial and tangential.

Commonly assigned LORD® U.S. application Ser. No. 08/533,824 entitled "Vibration Isolation System Including A Passive Tuned Vibration Absorber" teaches the combination of a TVA proximate to an elastomer mount. The TVA devices described therein have the disadvantage that they can only generate forces in the radial and/or tangential directions, therefore, they are only effective at providing a stiffer structure and effective vibration isolation in the radial and/or tangential directions.

SUMMARY OF THE INVENTION

In light of the limitations and drawbacks of the prior art, the present invention is a Multi-Directional Tuned Vibration Absorber (hereinafter MDTVA). The MDTVA may be used in combination with a mount/isolator located proximate thereto, as part of an isolation system. The MDTVA when used in an isolation system reduces vibration that is transmitted from a vibrating member, such as an engine or the like, into a structure at a predetermined operating frequency or within a limited operating frequency range thereabouts. Likewise, the MDTVA described herein may be used as a stand-alone device for attaching to any vibrating member and reducing/absorbing vibration thereof. The MDTVA may provide absorber action in as many as three directions, such as radial, tangential, and fore-and-aft directions, some of which may include a rotational contribution.

The Multi-Directional Tuned Vibration Absorber (MDTVA) includes a first tuning mass which resonates (in sync with a second tuning mass) at first resonant frequency along a first direction, a second tuning mass which resonates at a second resonant frequency along a second direction, a base member for attachment to a vibrating member (such as a vibrating engine, structure, mount, etc.), the first spring is flexibly interconnected (and preferably bonded) between the base member and first tuning mass and the first spring substantially restricts motion of the first tuning mass to motion along the first axis (direction) only, and the second spring flexibly interconnects between the first tuning mass and the second tuning mass, where the second spring substantially restricts relative motion between the first and second tuning mass to motion along a second axis (direction), which is substantially perpendicular to the first axis. The first and second resonant frequencies may be tuned independently of each other by means of adding additional masses, adjusting the position of a tuning mass, or combinations thereof.

It is an advantage of the present invention MDTVA that it allows effective vibration absorber action in three different directions in a unitary-detachable device.

In another aspect of the invention, it is an advantage that the MDTVA may be retrofitted to an existing structure and control vibration along three axes.

In another aspect of the invention, it is an advantage of the MDTVA that the resonant frequencies may be separately and independently tuned.

The abovementioned and further novel details, features, and advantages of the present invention will become apparent from the accompanying descriptions of the preferred embodiment and the attached drawings.

BRIEF DESCRIPTION OF THE DRAWINGS

The accompanying drawings, which form a part of the specification, illustrate several embodiments of the present invention. The drawings together with the description serve to fully explain the invention. In the drawings.

DETAILED DESCRIPTION OF THE PREFERRED EMBODIMENTS

Figure 1:
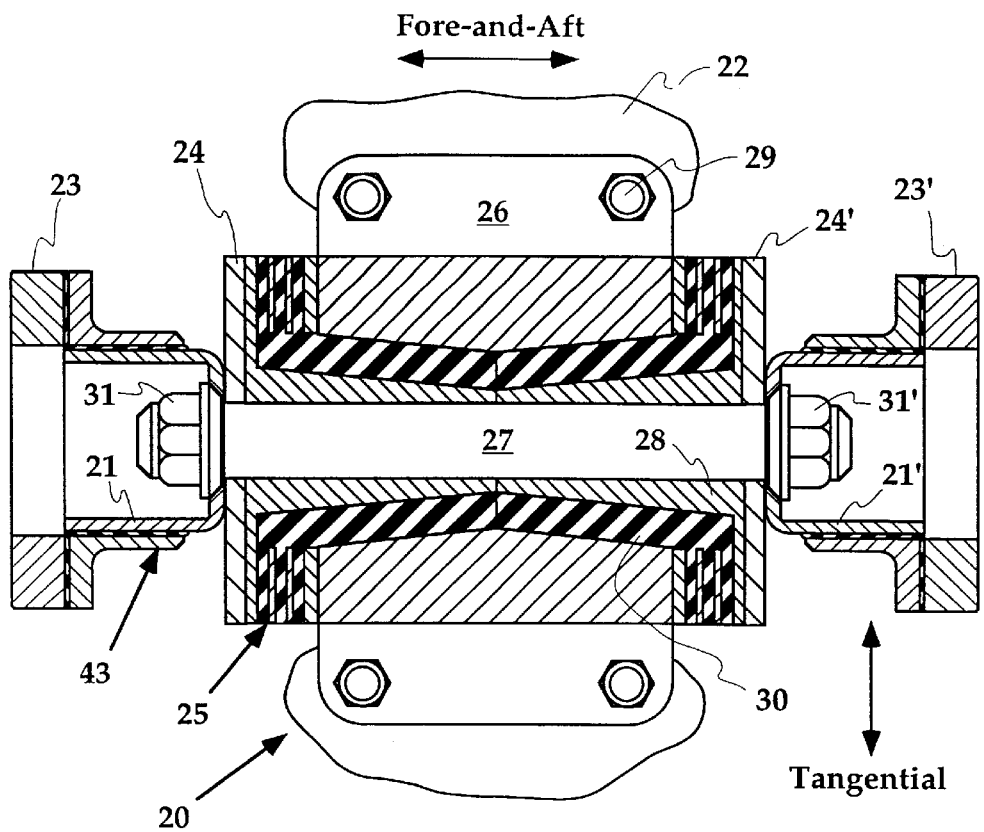
FIG. 1 is a cross-sectional side view of an isolation system including an elastomer mount with a MDTVA assembly (including two MDTVAs) attached through the inner member.

The present invention MDTVA will be described with reference to the attached drawings wherein like numerals denote like elements when comparing the various embodiments herein. Now referring to FIG. 1, an isolation system 20 including multiple ones of the MDTVA's 23, 23' of the present invention is shown. The isolation system 20 including MDTVAs 23, 23' is particularly useful for reducing dynamic vibration transmitted between a vibrating member 22 such as an engine, and a supporting structure 24, 24' such as an aircraft yolk, spar, or beam structure. The isolation system 20 and MDTVAs 23, 23' are most effective at a predetermined operating frequency $f_o$ but is also effective within a narrow range about $f_o$. Typically $f_o$ would coincide with a predominant disturbance frequency, such as the cruise frequency of an aircraft engine. It is desired, that the range of isolation would encompass normal variations in engine speed, for example, variations in engine speed due to cruise, takeoff, and landing maneuvers.

Further, it is particularly advantageous, but not essential, that the isolation system 20 is used where a vibrating member 22 attaches to a relatively soft structure. Moreover, although the isolation system 20 and MDTVAs 23, 23' are described with reference to aircraft systems, it should be understood that the isolation system combining an elastomer mount and at least one MDTVA will find application anywhere any vibrating member is attached to a structure. In particular, it should be understood that the MDTVA 23 may be used as a stand-alone apparatus, without the mount. For example, the MDTVA 23 may be directly attached to any vibrating machinery or vehicle component, etc. that is vibrating in three directions to absorb vibrations thereof.

In more detail, the isolation system 20 is comprised of the combination of a mount 25 and at least one MDTVA 23. In this case, two MDTVAs 23 and 23', that are preferably matched in resonant frequency, i.e., each individual direction of each MDTVA 23, 23' are tuned to exhibit a resonance at the same frequency. In particular, the mount 25 can be any type known to those of skill in the art, and preferably includes an outer member 26 for attachment to the vibrating member 22, an inner member 28 for interconnection to the structure 24, 24' and a flexible section 30, which is preferably a natural rubber, a blend of synthetic elastomer and natural rubber, silicone elastomer, or the like. The flexible section 30 causes a flexible interconnection between the inner and outer members 28, 26 and allows relative movement therebetween, such as fore-and-aft, radial (into and out of the paper) or tangential. The mount 25 acts as a primary isolator between the structure 24 and the vibrating member 22 to initially isolate vibrations transmitted from the vibrating member 22. Any residual vibrations not isolated by mount 25 are further reduced/absorbed by MDTVA assembly 43 including at least one MDTVA 23.

Means for attaching the outer member 26 to vibrating member 22 may include fasteners 29, or the like. Means for attaching the inner member 28 to the structure 24 may include base member 21, 21', rod 27, and nuts 31, 31'. It should be understood, that the inner member 28 could attach to the vibrating member 22 and the outer member 26 to the structure 24, 24' with the MDTVAs attached to the structure 24, 24' side and still fall within the scope of the appended claims.

Figure 3A:
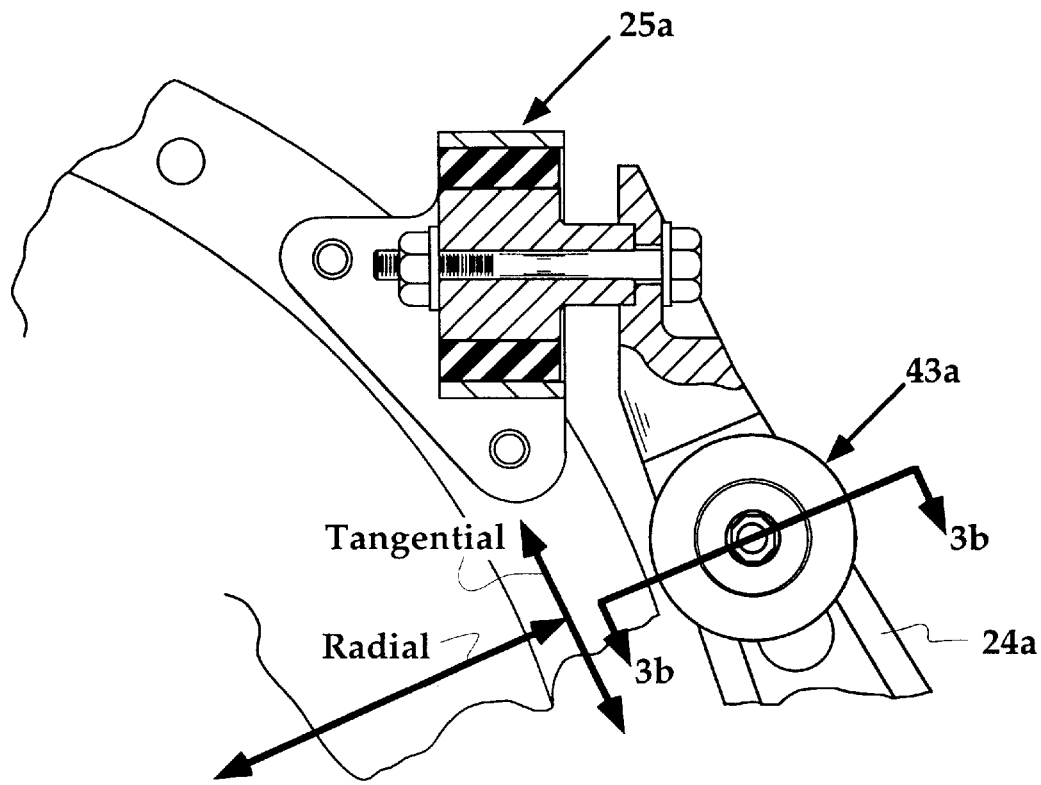
FIG. 3a is a partially cross-sectioned side view of another embodiment of isolation system including multiple MDTVAs located in the proximity of the mount.

At least one MDTVA 23 is preferably attached to structure 24, 24' proximate the mount 25. The term proximate preferably encompasses both direct interconnection to the structure 24, 24' at the location of the inner member 28 as shown in the FIG. 1 embodiment, as well as attachment to the structure at a point where the MDTVA will be effective (FIG. 3a). The allowable attachment points for effective location of the MDTVA will depend on the stiffness (flexibility) of the structure. Typically, the softer and more flexible the structure, the closer in proximity the MDTVA will have to be placed to the mount. Preferably, each MDTVA 23, 23' is tuned such that it exhibits a first resonant frequency $f_{n1}$ in a first direction and a second resonant frequency fn2 in a second direction. Each are preferably tuned such they occur slightly below the most common operating frequency $f_o$. Preferably also, they are tuned to the same frequency.

In this embodiment, twin MDTVAs are used, 23 and 23' which are interconnected and clamped to the structure (clevis-like members) 24, 24' by attaching directly to the rod 27 which is inserted through inner member 28 and which extends through the elastomeric mount 25. It is notable that the MDTVA assembly 43 clamps the mount 25 to the structure 24, 24'.

As described with reference to FIG. 2a and FIG. 2b, each of MDTVAs 23, 23' (FIG. 1) includes a first tuning mass 32 which includes a preferably generally cylindrically-shaped body portion 33 and a radially-extending lip 37 and a second tuning mass 34 which is generally puck-shaped and includes a hollow 38 formed therein. Preferably, the first tuning mass 32 is manufactured from aluminum or other light weight material so that the mass of second tuning mass 34 is the primary mass active along axis A—A. By keeping the mass of the first tuning mass 32 to a minimum and making second tuning mass 34 resonant in all directions, the overall weight of the MDTVA 23 is minimized. This provides maximum effectiveness in all three directions (A—A, B—B, and C—C) with minimum MDTVA weight.

Preferably, the second tuning mass 34 is manufactured from steel or other high density material such as tungsten or tungsten alloy. Base 21, preferably manufactured from steel, aluminum or the like, is preferably cup-shaped, and disposed adjacent to, and encircled by, the generally cylindrically-shaped body portion 33 of first tuning mass 32. First spring 35 which is generally cylindrically-shaped flexibly interconnects the base member 21 and the first tuning mass 32. Likewise, second spring 36 flexibly interconnects the second tuning mass 34 and the first tuning mass 32. First and second spring 35, 36 are preferably manufactured from a natural rubber, a blend of natural rubber and synthetic elastomer, silicone elastomer, or the like and are preferably bonded directly between the substantially parallel surfaces of second tuning mass 34 and first tuning mass 32 and between the outer diameter of base member 21 and the inner diameter of first tuning mass 32.

It is preferable that the springs 35, 36 operate in pure shear along their tuned directions (A—A, B—B, and C—C). For example, the first spring 35 is placed in pure shear loading upon encountering vibration of the structure 24" in the fore-and-aft direction which excites tuning masses 32, 34 and causes them both to resonate, in sync, in the fore-and-aft direction along axis A—A. Notably, vibration of the structure 24" in the tangential and/or radial direction only excites the second tuning mass 34 and causes it, alone, to resonate in the radial and/or tangential direction along axis B—B and/or C—C or combinations thereof. Therefore, the MDTVAs 23 and 23' provide absorber forces, i.e., inertial forces that are applied tangentially, radially, and/or in the fore-and-aft directions, or combinations thereof (such as all three at once) to enable cancellation or reductions in vibrations of the vibrating structure 24" in all those directions. It is most preferable that the material used for springs 35, 36 would be a silicone material that exhibits a loss factor (tan delta) of about 0.10 and exhibits a dynamic shear modulus of about 95 psi.

MDTVA EXAMPLE

Figure 2A:
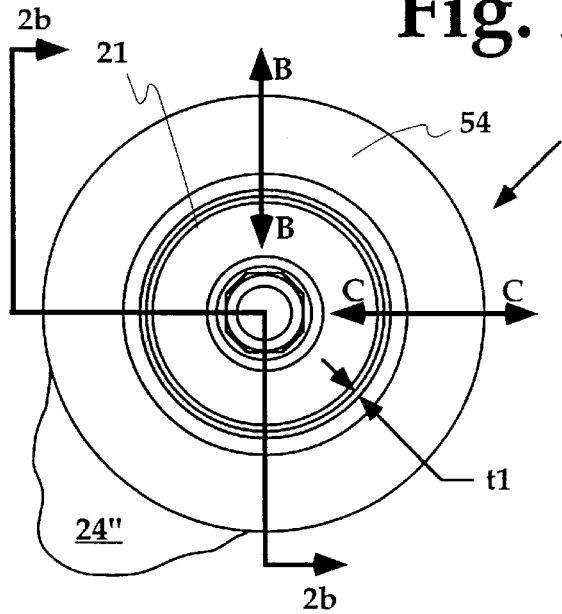
FIG. 2a is an end view of the MDTVA.
Figure 2B:
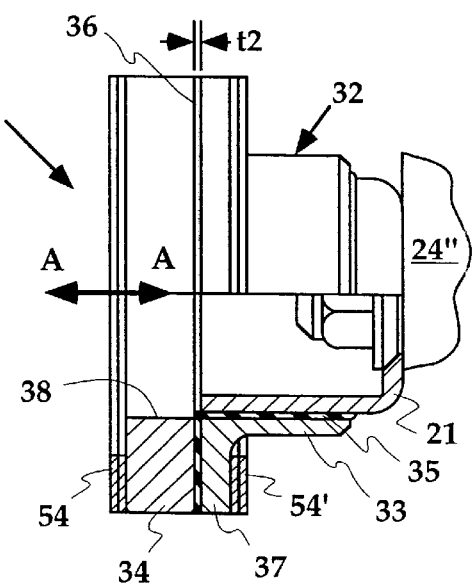
FIG. 2b is a partial cross-sectional side view of an embodiment of MDTVA assembly showing the details thereof.

By way of example, and not to be considered limiting, the MDTVA as illustrated in FIG. 2a and FIG. 2b and which is shown attached to a vibrating structure 24" includes a first spring 35 with a thickness t1 which preferably has a constant thickness within the layer of about 0.023 inch (0.906 mm). Similarly, the thickness t2 of the second spring 36 is about 0.017 inch (0.669 mm). The MDTVAs include a first tuning mass 32 having a mass M1 of about 0.05 lb. mass (0.023 kg) and a second tuning mass 34 having a mass M2 of about 0.325 lb. mass (0.147 kg). The dynamic shear stiffness of the first spring 35 is about K1=13,382 lbf./in. (2,431,110 N/m) and the dynamic shear stiffness of second spring 36 is about K2shear=20,877 lbf./in. (3,656,122 N/m). The cocking stiffness (spring rate) of the first spring 35 results in an effective linear spring rate of Kcocking1=16,461 lbf./in. along the in-plane B—B and C—C axes (Radial and Tangential directions). The cocking spring rate Kcocking1 and shear spring rate K2shear of second spring 36 add in a series-spring relationship to provide the overall in-plane spring rate K2 having both the aforementioned cocking and shear contributions. The combined in-plane spring rate K2 is approximately K2=9,204 lbf./in. (1,611,866 N/m) and determines the frequency at which the second tuning mass 34 resonates. The cocking contribution is preferably minimized as much as possible by either making the first spring 35 (tubeform section) lengthy and thin or by substantially aligning the elastic center of the first spring 35 with the mass center of the second tuning mass 34 as will be described fully with reference to FIG. 4 herein. For this example, the resulting first and second resonant frequencies $f_{n1}$, $f_{n2}$ are about 500 Hz. Both are approximated according to Equation 1 through 4 below.

$$fn1 = \tfrac{1}{2}\pi \{K1/M1+M2+MW1+MW2\}^{1/2} \quad \text{Equation 1}$$

$$fn2 = \tfrac{1}{2}\pi \{K2/M2+MW2\}^{1/2} \quad \text{Equation 2}$$

$$K2 = \{1/K2\text{shear}+1/K1\text{cocking}\}^{-1} \quad \text{Equation 3}$$

$$K\text{cocking1} = K\text{tors}/X^2 \quad \text{Equation 4}$$

Where:
- M1=Mass of First Tuning Mass 32
- K1=Shear Stiffness of First Spring 35
- M2=Mass of Second Tuning Mass 34
- K2 shear=Shear Stiffness of Second Spring 36
- K1cocking=Converted Cocking Stiffness of First Spring 35
- K2=In-plane Combined Stiffness
- Ktors=torsional stiffness about elastic center of First Spring 35
- X=Distance from center of second mass 34 to elastic center of first spring K1
- MW1=Mass of First Tuning Wafer 54
- MW2=Mass of Second Tuning Wafer 54'
- fn1=First resonant frequency
- fn2=Second resonant frequency The operating frequency $f_o$ for this system is about $f_o$=530 hz. The ratio of both $f_{n1}/f_o$ and $f_{n2}/f_o$ are both preferably about 0.94. This type of MDTVA assembly 43 (FIG. 1) would be effective when placed on a soft structure having a dynamic structural stiffness of less than about 100,000 lbf./in. (17,500,000 N/m). For example, small commercial fixed wing aircraft, i.e., business jets would typically have structure softer than this value.

Wafers 54 and 54' attach to tuning masses 34 and 32 by way of fastening means such as adhesive, and act as adjustment masses to finely tune the resonant frequencies $f_{n1}$ and $f_{n2}$ of the MDTVA 23. Wafers 54 and 54' are preferably manufactured by stamping a steel plate. However, they may be made from higher density materials, such as tungsten alloy, if space is limited. Generally, where tuning is fairly precise, such as for aircraft applications, wafers 54 may be needed. To illustrate the means for tuning the MDTVA 23 including multiple wafer masses 54, 54', the below procedure is outlined.

First, the MDTVA 23 is integrally bonded whereby first spring 35 is bonded between base 21 and first tuning mass 32. Likewise, second spring 36 is bonded between first and second tuning masses 32, 34. The stiffness of the elastomer used is purposefully compounded in a somewhat higher stiffness than would be required to achieve the appropriate frequencies fn1, fn2. In this way, in the event of deviations in thickness t1 and t2, it will still be achievable to tune the MDTVA 23 by adding additional mass thereto. Next, the tangential and radial directions would be tested. If the frequency fn2 were high, then additional mass would be added to the MDTVA 23 by way of adding wafer or wafers 54 to increase the mass, and, thus, lowering fn2. Notably, the tangential stiffness and radial stiffness would be preferably equal for a uniform rubber section width thereby providing equal resonant frequencies in those directions. Once the desired radial/tangential tuning along axes B—B and C—C are appropriately achieved, the fore-and-aft tuning is adjusted. If fn1 is high, more mass, in the form of a wafer or wafers 54' are added to lower fn1. Notably, the addition of wafer mass(es) 54' does not effect the tuning of fn2. Therefore, it should be understood that the first and second resonant frequencies fn1 and fn2 are independently tunable, in that, one can be tuned without effecting the other.

Figure 3B:
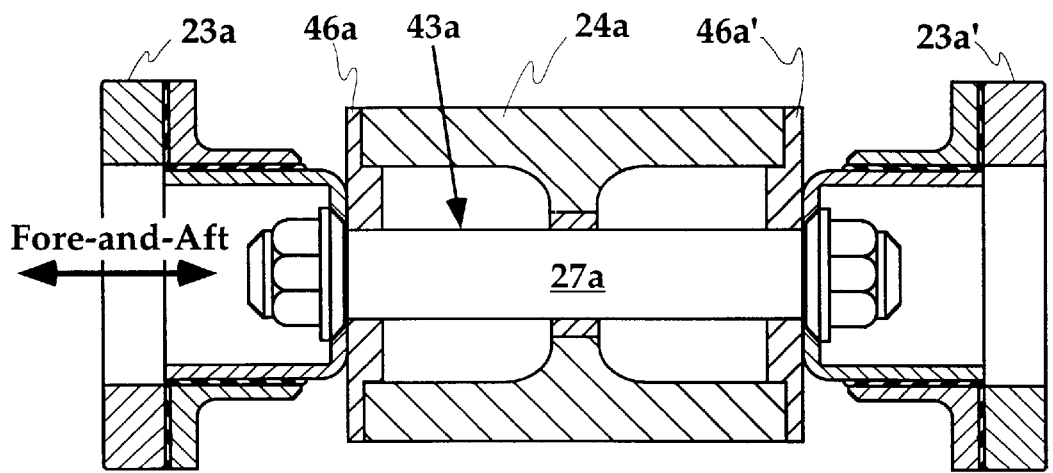
FIG. 3b is a cross-sectioned side view of the MDTVA assembly which is retrofitted and attached to an I-beam-type structure in the proximity of the elastomer mount.

FIG. 3a and FIG. 3b illustrate a MDTVA assembly 43a including at least one MDTVA for attachment to a structure 24a in the proximity of a mount 25a. The structure 24a may be a box-beam, frame, unibody, I-beam (as shown in FIG. 3b), or the like. The MDTVA assembly 43a preferably comprises two MDTVAs 23a and 23a' which are preferably interconnected by rod 27a which acts as the means for clamping the MDTVA assembly 43a directly to, and preferably through, the structure 24a in the proximity of the mount 25a. The MDTVA assembly 43a preferably includes clamping plates 46a and 46a' or the like to distribute the clamping loads over the surface of the structure 24a. The clamping plates 46a and 46a' may be steel, aluminum, plastic, or the like.

As installed, clamping plates 46a and 46a' exert a clamping force on the surface of structure 24a to rigidly fasten the passive MDTVA assembly 43a to the structure 24a. In this way, any inertia/absorbing forces generated by the MDTVAs 23a and 23a' are directly transferred to the structure 24a to suppress vibration thereof in the radial, tangential, and/or fore-and-aft directions and/or increase the impedance of the structure 24a and make it appear dynamically stiffer to the mount 25a in all of those directions.

If the structure 24a is a beam-like structure, as is the case with most aircraft structures, then it is preferable to place the MDTVA assembly 43a including MDTVAs 23a, 23a' on the structure 24a on the last 20% of the beam length adjacent to the mount 25a. Even when placed at the location representing 20% from the end of the beam, the MDTVA is only approximately 50% effective as compared to when it is placed on the end of the beam structure 24a. Therefore, it is desired to place the MDTVA assembly 43a at, or beyond, 80% of the beam length proximate to the mount 25a. Furthermore, the inventor has determined that it is preferable that the mount dynamic stiffness and the structure dynamic stiffness be approximately equal in magnitude for optimal effectiveness of the MDTVA assembly 43a. Although, MDTVA's 23a, 23a are shown without means for adjusting the resonant frequencies fn1, fn2, it should be understood that adjustments thereto may be accomplished by the methods and means described with reference to FIGS. 2a–2b and FIG. 4–5 which follow.

Figure 4:
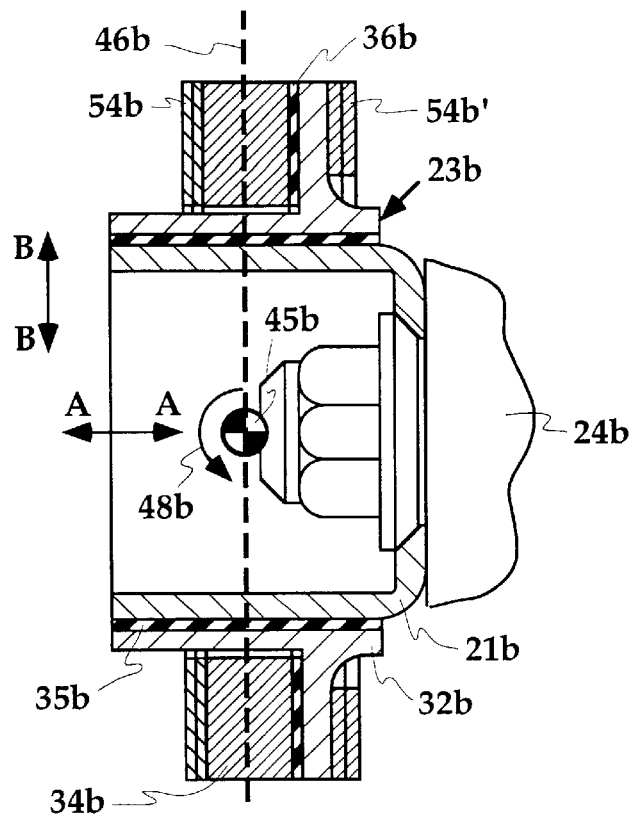
FIG. 4 is a cross-sectioned side view of another MDTVA embodiment.

FIG. 4 illustrates another MDTVA 23b for attachment to and absorbing vibration of any vibrating member 24b. This embodiment is similar to that described with reference to FIG. 2a, 2b except that any cocking contribution of the first spring 35b to the second resonant frequency fn2 is minimized by locating the center of mass 46b (indicated by dotted line) of the second tuning mass 34b at a position along the axis A—A such that it substantially coincides with the elastic center 45b of the first spring 35b. The elastic center 45b is located by determining at what point along axis A—A to apply a force which will result in zero rotation of the first tuning mass 32b relative to base member 21b, i.e., where the rotation vector 48b is equal to zero. In this way, any contribution of cocking of the first spring 35b in determining the second resonant frequency fn2 along axis B—B is minimized because the center of mass 45b is not offset from the elastic center 45b as in the FIG. 2a, 2b embodiment. Therefore vibration of the second tuning mass 34b is provided via shearing of the second spring 36b. Wafers 54b, 54b' may be used for independent tuning of fn1, fn2.

Figure 5:
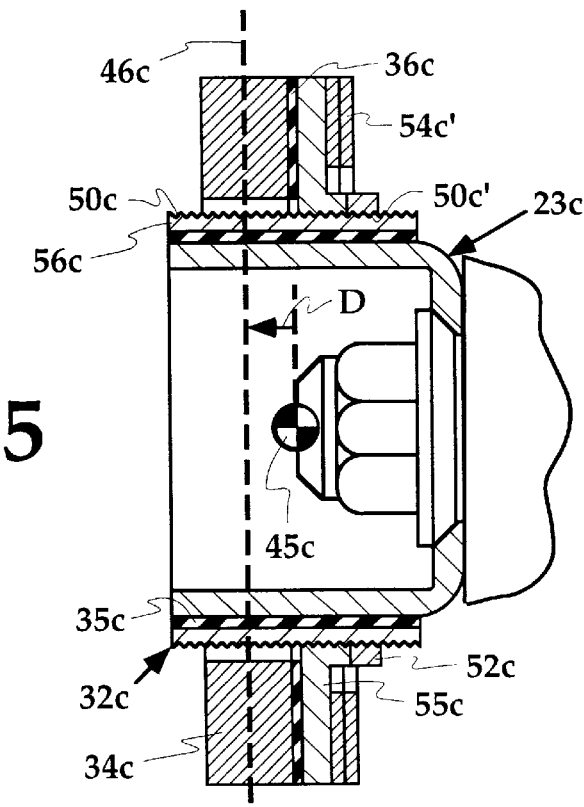
FIG. 5 is a cross-sectioned side view of a MDTVA embodiment including position adjustment of a tuning mass.

FIG. 5 illustrates another MDTVA 23c which includes means for adjusting the position of the second tuning mass 34c, and therefore, its center of mass 46c relative to the elastic center 45c. Moving the second tuning mass 34c further outboard in the direction of arrow D from the current position shown will lower the second resonant frequency fn2 because more and more of the cocking component Kcocking1 of first spring 35c will be added in series to the contribution from second spring 36c. It should be understood that the further the center of mass 46c is removed from the elastic center 45c, the more dominant an effect the cocking stiffness will have on the second resonant frequency fn2. The adjustment is preferably accomplished by threads 50c, 50c' cut on the sleeve 56c and adjuster 55c. jam nut 52c secures the adjuster 55c in place relative to the sleeve 56c. Together, the sleeve 56c, adjuster 55c and jam nut 52c comprise the first tuning mass 32c. Wafers 54c' may be used to adjust the first resonant frequency fn1.

In summary, the present invention provides a novel Multi-Directional Tuned Vibration Absorber (MDTVA) which includes a first tuning mass, a second tuning mass, first and second springs, and a base member. The first tuning mass vibrates at a first resonant frequency fn1 along a first direction and the second tuning mass vibrates along the first direction at the first resonant frequency fn1 and also vibrates at a second resonant frequency fn2 along a second direction. The first spring flexibly interconnects between the base member and the first tuning mass. The first spring substantially restricts motion of the first tuning mass to motion along a first axis only. Likewise, the second spring is flexibly interconnected between the first and second tuning masses and the second spring substantially restricts relative motion of the second tuning mass to motion along the second axis. Notably, the second axis is preferably substantially perpendicular to the first axis. In another aspect, the first and second resonant frequencies fn1 and fn2 may be tuned independently by the addition of wafer-like masses or adjustment of the position of the second tuning mass.

While several embodiments of the present invention have been described in detail, various modifications, alterations, and changes may be made by those of ordinary skill in the art without departing from the spirit and scope of the present invention as defined in the appended claims. It is intended that all such modifications, alterations, and changes fall within the appended claims and be considered part of the present invention.

I claim:

1. A multi-directional tuned vibration absorber, comprising:
   (a) a base member,
   (b) a first tuning mass which vibrates relative to said base member predominantly along a first axis and at a first resonant frequency,
   (c) a second tuning mass vibrating relative to said base member along said first axis at said first resonant frequency and also vibrating along at least two second axes at a second resonant frequency, each said second axis being substantially perpendicular to said first axis,
   (d) a first elastomeric spring flexibly interconnected between said base member and said first tuning mass such that vibration of said first tuning mass is constrained substantially solely by said first spring substantially restricting motion of said first tuning, mass to allow motion along said first axis only; and
   (e) a second elastomeric spring flexibly interconnected between said first tuning mass and said second tuning mass, said second spring substantially restricting motion of said second tuning mass relative to said first tuning mass to motion along said at least two second axes.

2. A multi-directional tuned vibration absorber of claim 1 wherein said first resonant frequency substantially coincides with said second resonant frequency.

3. A multi-directional tuned vibration absorber of claim 1 adapted to be mounted in an aircraft defining a fore-and-aft direction, a radial direction and a tangential direction such that said first axis substantially coincides with the fore-and-aft direction, wherein when said multi-directional tuned vibration absorber is so mounted in the aircraft, said at least two said second axes substantially coincide with:
  (a) the radial direction, and
  (b) the tangential direction.

4. A multi-directional tuned vibration absorber of claim 1 wherein at least one of said first resonant frequency and said second resonant frequency is tuned to a frequency below a predominant disturbance frequency.

5. A multi-directional tuned vibration absorber of claim 1 being adapted for mounting adjacent a prescribed engine and wherein both said first resonant frequency and said second resonant frequency are tuned to just below a prescribed predominant engine operating frequency of the engine.

6. A multi-directional tuned vibration absorber of claim 1 wherein said first spring exhibits an elastic center and said second tuning mass exhibits a center of mass and where said elastic center and said center of mass are substantially coincident.

7. A multi-directional tuned vibration absorber of claim 1 further including means for adjusting at least one of said first resonant frequency and said second resonant frequency.

8. A multi-directional tuned vibration absorber of claim 7 wherein said means for adjusting is an addition of mass.

9. A multi-directional tuned vibration absorber of claim 8 wherein said additional mass is a wafer of high density material.

10. A multi-directional tuned vibration absorber of claim 7 wherein said means for adjusting is moving a position of said second tuning mass.

11. A multi-directional tuned vibration absorber of claim 1 which is adapted for attachment proximate a mount by means of at least one of an inner member of said mount and a structure which is interconnected to said mount.

12. A multi-directional tuned vibration absorber of claim 1 wherein said first spring includes a cylindrically-shaped elastomer and said second spring includes a disc-shaped elastomer.

13. A multi-directional tuned vibration absorber of claim 1 wherein said base member is cup-shaped.

14. A multi-directional tuned vibration absorber of claim 1 wherein said second tuning mass includes a puck-shaped portion and said first tuning mass includes a cylindrically-shaped portion.

15. A multi-directional tuned vibration absorber of claim 1 which is further included within an isolation system, said isolation system further comprising:
  (a) an elastomer mount, including;
    (i) an outer member with means for attachment to a vibrating member,
    (ii) an inner member with means for attachment to a structure,
    (iii) a flexible elastomer section interconnected between said outer member and said inner member thereby allowing relative movement therebetween, and
  (b) a passive tuned absorber assembly including two of said multi-directional tuned vibration absorbers.

16. A multi-directional tuned vibration absorber, comprising:
  (a) a cup-shaped base member,
  (b) a first tuning mass predominantly vibrating relative to said base member at a first resonant frequency along a first axis,
  (c) a second tuning mass also vibrating relative to said base member at said first resonant frequency along said first axis and along at least one second axis at a second resonant frequency, each said second axis being substantially perpendicular to said first axis,
  (d) a first cylindrically-shaped elastomer spring flexibly interconnected between said cup-shaped base member and said first tuning mass such that vibration of said first tuning mass is constrained substantially solely by said first cylindrically-shaped elastomer spring, said first cylindrically-shaped elastomer spring substantially restricting motion of said first tuning mass to allow motion along said first axis only, and
  (e) a second disc-shaped spring flexibly interconnected between said first tuning mass and said second tuning mass, said second disc-shaped spring substantially restricting relative motion between said first and said second tuning mass to motion along said at least one second axis.

17. A multi-directional tuned vibration absorber of claim 16 further including means for independently adjusting said first resonant frequency and said second resonant frequency.

18. A multi-directional tuned vibration absorber, comprising:
  (a) a cup-shaped base member,
  (b) a first tuning mass including a cylindrically-shaped portion predominantly vibrating relative to said base member at a first resonant frequency along a first axis,
  (c) a second tuning mass including a puck-shaped portion vibrating relative to said base member with said first tuning mass along said first axis at said first resonant frequency and also vibrating at a second resonant frequency along at least one second axis which is substantially perpendicular to said first axis,
  (d) a first cylindrically-shaped elastomer spring flexibly interconnected between said cup-shaped base member and said cylindrically-shaped portion of said first tuning mass such that vibration of said first tuning mass is constrained substantially solely by said first cylindrically-shaped elastomer spring, said first cylindrically-shaped elastomer spring substantially restricting motion of said first tuning mass to allow motion along said first axis only, and
  (e) a second disc-shaped spring flexibly interconnected between said first tuning mass and said second tuning mass, said second disc-shaped spring substantially restricting relative motion between said first tuning mass and said second tuning mass to motion along said at least one second axis only.

19. A multi-directional tuned absorber of claim 18 further including means for independently adjusting said first resonant frequency and said second resonant frequency.

20. A multi-directional tuned vibration absorber, comprising:
  (a) a base member,
  (b) a first tuning mass which vibrates relative to said base member predominantly along a first axis and at a first resonant frequency,
  (c) a second tuning mass vibrating relative to said base member along said first axis at said first resonant frequency and also vibrating along at least one second axis at a second resonant frequency, each said second axis being substantially perpendicular to said first axis,
  (d) a first spring flexibly interconnected between said base member and said first tuning mass such that vibration of said first tuning mass is constrained substantially solely by said first spring, said first spring substantially restricting motion of said first tuning mass to allow motion along said first axis only, (e) a second spring flexibly interconnected between said first tuning mass and said second tuning mass, said second spring substantially restricting motion of said second tuning mass relative to said first tuning mass to motion along said at least one second axis, and (f) means for adjusting at least one of said first resonant frequency and said second resonant frequency, wherein said means for adjusting is an addition of mass.

21. A multi-directional tuned vibration absorber of claim 20 wherein said additional mass is a wafer of high density material.

22. A multi-directional tuned vibration absorber, comprising:

(a) a base member, (b) a first tuning mass which vibrates relative to said base member predominantly along a first axis and at a first resonant frequency, (c) a second tuning mass vibrating relative to said base member along said first axis at said first resonant frequency and also vibrating along at least one second axis at a second resonant frequency, each said second axis being substantially perpendicular to said first axis, (d) a first spring flexibly interconnected between said base member and said first tuning mass such that vibration of said first tuning mass is constrained substantially solely by said first spring, said first spring substantially restricting motion of said first tuning mass to allow motion along said first axis only, (e) a second spring flexibly interconnected between said first tuning mass and said second tuning mass, said second spring substantially restricting motion of said second tuning mass relative to said first tuning mass to motion along said at least one second axis, and (f) means for adjusting at least one of said first resonant frequency and said second resonant frequency, wherein said means for adjusting is moving a position of said second tuning mass.

23. A multi-directional tuned vibration absorber, comprising:

(a) a base member, (b) a first tuning mass which vibrates relative to said base member predominantly along a first axis and at a first resonant frequency, (c) a second tuning mass vibrating relative to said base member along said first axis at said first resonant frequency and also vibrating along at least one second axis at a second resonant frequency, each said second axis being substantially perpendicular to said first axis, (d) a first spring including a cylindrically-shaped elastomer, said first spring flexibly interconnected between said base member and said first tuning mass such that vibration of said first tuning mass is constrained substantially solely by said first spring, said first spring substantially restricting motion of said first tuning mass to allow motion along said first axis only, and (e) a second spring including a disc-shaped elastomer, said second spring flexibly interconnected between said first tuning mass and said second tuning mass, said second spring substantially restricting motion of said second tuning mass relative to said first tuning mass to motion along said at least one second axis.

24. A multi-directional tuned vibration absorber, comprising:

(a) a base member, (b) a first tuning mass including a cylindrically-shaped portion, said first tuning mass vibrating relative to said base member predominantly along a first axis and at a first resonant frequency, (c) a second tuning mass including a puck-shaped portion, said second tuning mass vibrating relative to said base member along said first axis at said first resonant frequency and also vibrating along at least one second axis at a second resonant frequency, each said second axis being substantially perpendicular to said first axis, (d) a first spring flexibly interconnected between said base member and said first tuning mass such that vibration of said first tuning mass is constrained substantially solely by said first spring, said first spring substantially restricting motion of said first tuning mass to allow motion along said first axis only, and (e) a second spring flexibly interconnected between said first tuning mass and said second tuning mass, said second spring substantially restricting motion of said second tuning mass relative to said first tuning mass to motion along said at least one second axis.

25. An isolation system, said isolation system comprising:

(a) a passive tuned absorber assembly including two multi-directional tuned vibration absorbers, each said multi-directional tuned vibration absorber comprising:
  (i) a base member;
  (ii) a first tuning mass which vibrates relative to said base member predominantly along a first axis and at a first resonant frequency;
  (iii) a second tuning mass vibrating relative to said base member along said first axis at said first resonant frequency and also vibrating along at least one second axis at a second resonant frequency, each said second axis being substantially perpendicular to said first axis;
  (iv) a first spring flexibly interconnected between said base member and said first tuning mass such that vibration of said first tuning mass is constrained substantially solely by said first spring, said first spring substantially restricting motion of said first tuning mass to allow motion along said first axis only; and
  (v) a second spring flexibly interconnected between said first tuning mass and said second tuning mass, said second spring substantially restricting motion of said second tuning mass relative to said first tuning mass to motion along said at least one second axis; and (b) an elastomer mount including:
  (i) an outer member with means for attachment to a vibrating member; and
  (ii) an inner member with means for attachment to a structure; and
  (iii) a flexible elastomer section interconnected between said outer member and said inner member thereby allowing relative movement therebetween.

* * * * *